United States Patent [19]

Yoshiaki

[11] 4,385,468
[45] May 31, 1983

[54] PROCESS AND APPLIANCE FOR HANDILY CULTIVATING MALTS OF MANY SPECIES

[76] Inventor: Kinsui Yoshiaki, 19-19 Tenma 1-Chome, Kita-Ku, Osaka, Japan, 530

[21] Appl. No.: 221,116

[22] Filed: Dec. 29, 1980

[51] Int. Cl.³ .............................................. A01G 31/02
[52] U.S. Cl. ........................................... 47/14; 47/61
[58] Field of Search ............... 47/14, 16, 59, 61, 69; 273/58 B

[56] References Cited

U.S. PATENT DOCUMENTS

| | | | |
|---|---|---|---|
| 1,637,250 | 7/1927 | Ashing | 47/14 |
| 2,796,697 | 6/1957 | Beyrodt | 273/58 B |
| 3,903,642 | 9/1975 | Yellin | 47/69 |
| 3,906,663 | 9/1975 | Peng et al. | 47/14 |
| 3,911,619 | 10/1975 | Dedolph | 47/14 |
| 4,006,557 | 2/1977 | Sawyer | 47/61 |
| 4,135,331 | 1/1979 | Lamlee | 47/61 |
| 4,180,941 | 1/1980 | Korematsu | 47/14 |

FOREIGN PATENT DOCUMENTS

| | | | |
|---|---|---|---|
| 1099052 | 8/1955 | France | 47/14 |
| 1382262 | 1/1975 | United Kingdom | 47/16 |

*Primary Examiner*—Robert E. Bagwill
*Attorney, Agent, or Firm*—William A. Drucker

[57] ABSTRACT

This invention relates to a rotatable seed sprouter adapted to container water and seed which can be manipulated by mere rotation of the sprouter.

1 Claim, 54 Drawing Figures

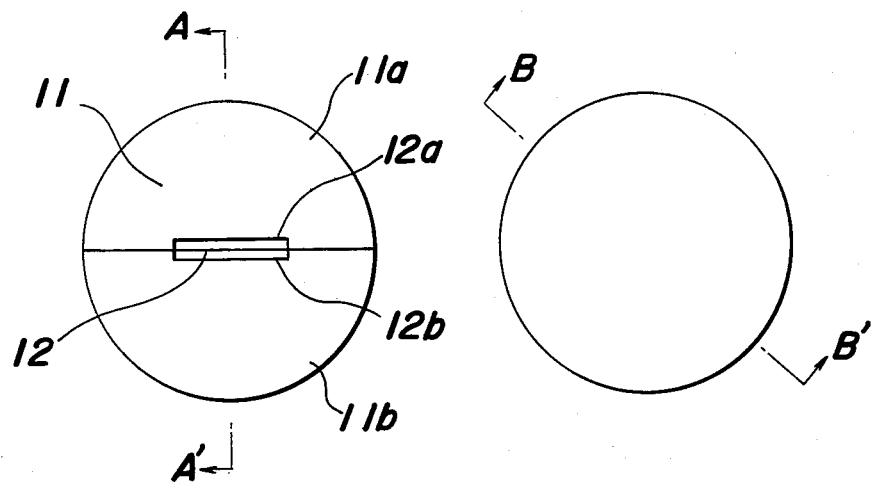
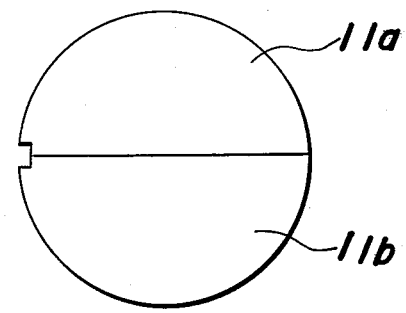
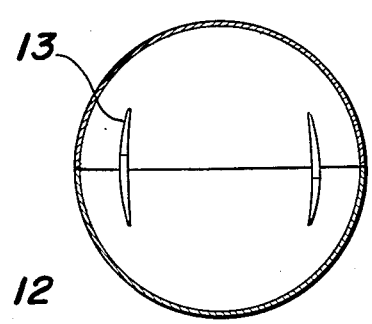
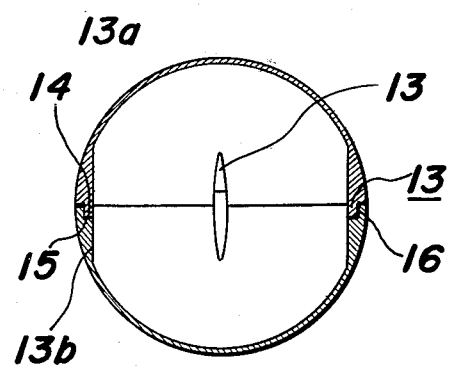

Fig. 8 (A)
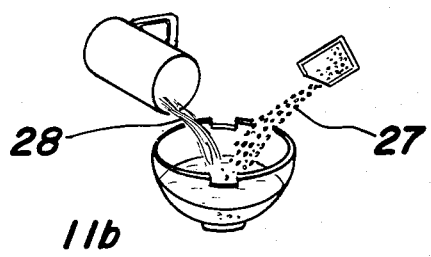
Fig. 8 (D)
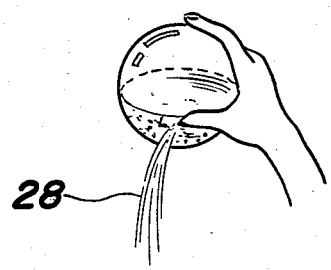
Fig. 8 (B)
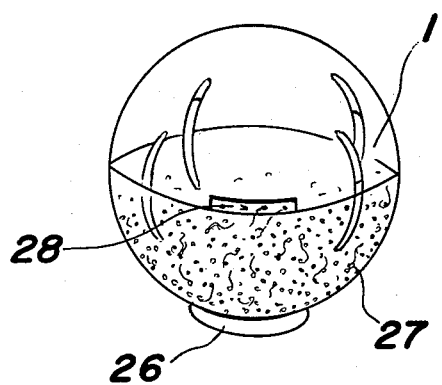
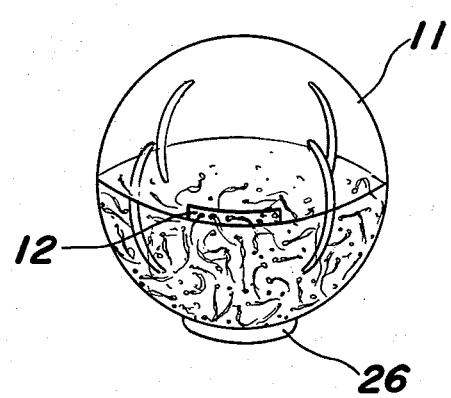
Fig. 8 (C)
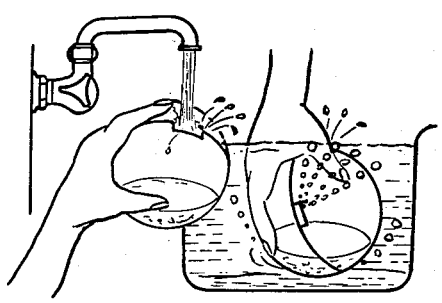
Fig. 8 (F)
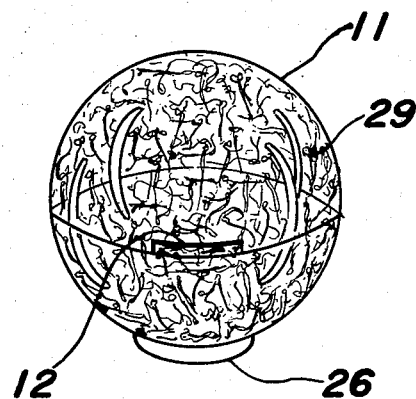

PROCESS AND APPLIANCE FOR HANDILY CULTIVATING MALTS OF MANY SPECIES

SUMMARY OF THE INVENTION

The present invention relates to a process and an appliance for easily cultivating malts of many species.

The term "malts" as used herein shall mean "cereal grain that is germinated by soaking in water, such as barley malts, beans sprouts and the like, including other vegetables artificially grown in the shade, for example, edible germs of bivalved greens and the like".

As a rule, such vegetable use for food as described above yield a crop in a somewhat difficult manner. Therefore, one or another simpler method of vegetable cultivation is being earnestly demanded. In the household vegetable culture of malts and the like, however, there often occur many difficulties due to over exposure to light and from excessive water supply. This is the reason why a simpler culture appliance has long been sought for in the household vegetable gardening.

Thereupon, the author of this invention made a study of a process for easily cultivating malts which would be applicable for home culture use without any trouble and by which the control of the necessary amount of water would be managed easily, as well as an applliance for easily cultivating malts which is constructed on the basis of the above-mentioned process and which would be further useful as an interior decoration if placed on a table.

BRIEF DESCRIPTION OF THE DRAWINGS

FIGS. 4 (A), (B), (C), (D), and (E) show a front view, a back view, a side view, a sectional view taken along the line A—A, and a sectional view taken along the line B—B, respectively;

FIG. 7 (E) indicates a modification where the appliance is formed into an elliptical body;

FIG. 7 (F) shows a rest ring for stabilizing the appliance;

FIGS. 8 (A), (B), (C), (D), (E), and (F) are explanatory views as to how to use, by way of example, one of the cultivation appliances according to the present invention.

DETAILED DESCRIPTION OF THE INVENTION

Figure 1:
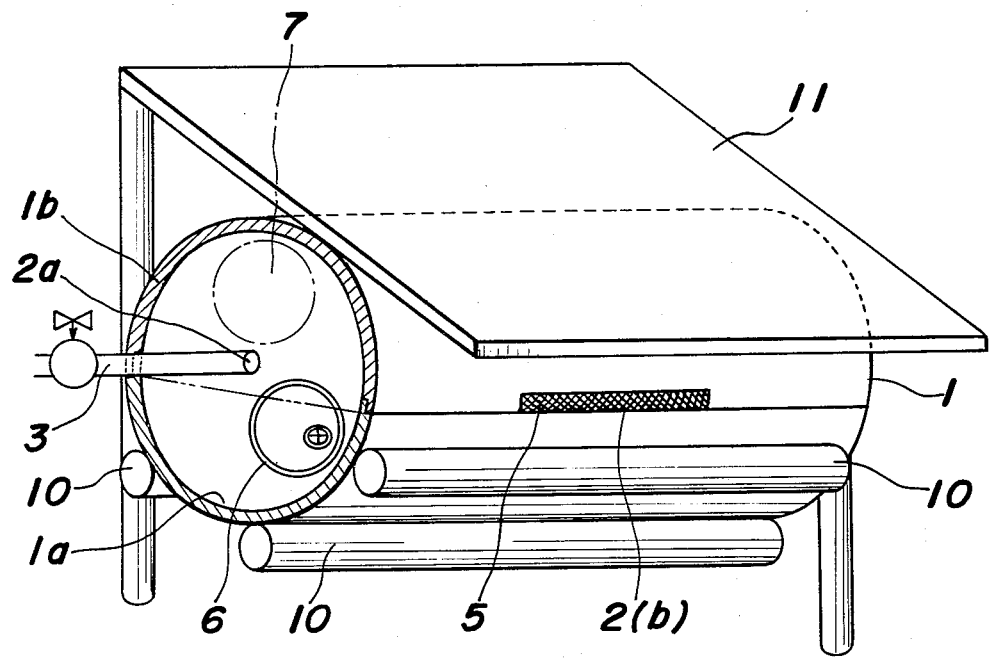
FIG. 1 is a schematically explanatory view of an apparatus for horticulture which can be used by the method according to the present invention.
Figure 2:
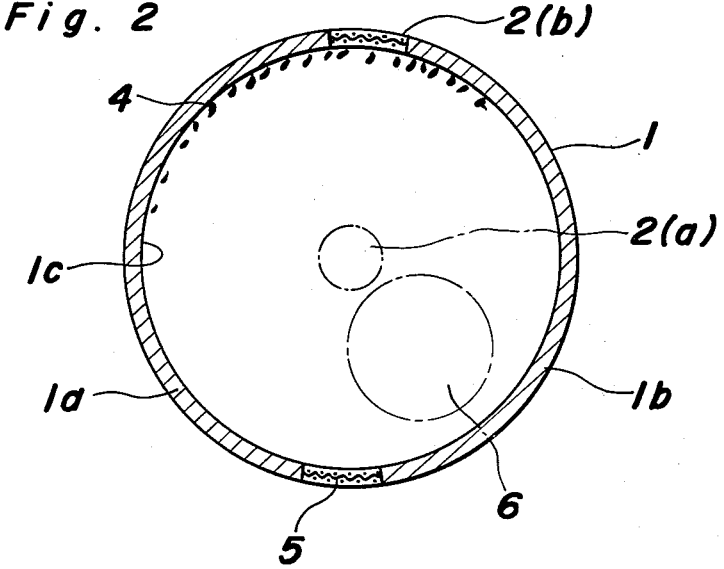
FIG. 2 is a cross-sectional view of the cultivation barrel in FIG. 1.
Figure 3A:
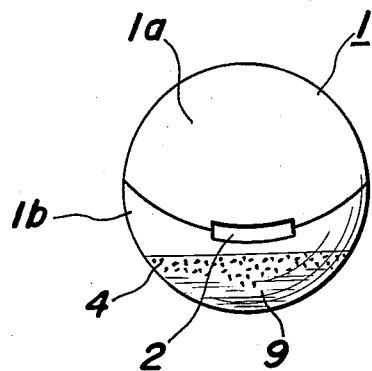
FIGS. 3 (A), (B), (C), (D), (E), and (F) are explanatory views of the states of cultivation of the respective culture appliances for home use.
Figure 3B:
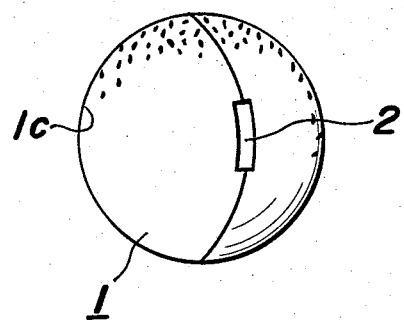
Figure 3C:
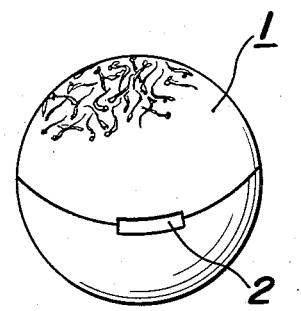
Figure 3D:
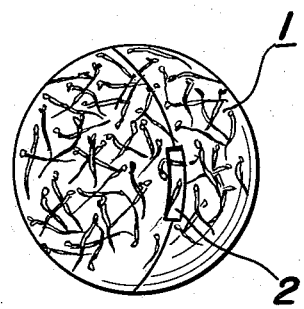
Figure 3E:
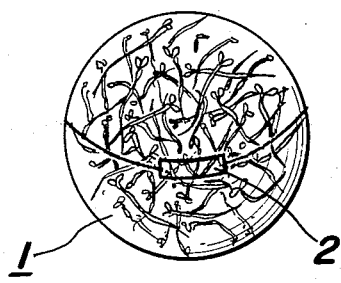
Figure 3F:
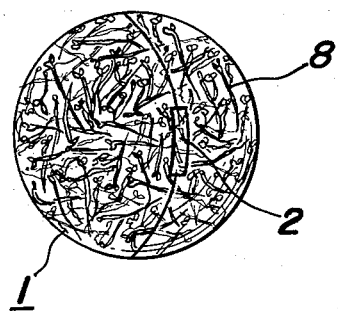

The invention will be now described in detail with reference to the accompanying drawings.

In FIGS. 1 to 8, the reference numeral (1) indicates a rotatable cultivation barrel whereon a water feeding-draining opening (2 or 2a and 2b) is provided. This opening (2) is sometimes separated into two, one of them as a feeding one (2a) and the other (2b) as a draining one as in the case of being used for horticulture.

The cultivation barrel (1) suffices for horticulture in facility agriculture if formed into a roller-shaped barrel as shown in FIG. 1, and for home gardening use if shaped in the form of a spherical barrel as shown in FIG. 3.

The water feeding-draining opening (2) may be divided into a feeding opening (2a) and a draining opening (2b) in the case of horticulture in facility agriculture, as mentioned above. In this case, it does not matter whether a steam pipe (3) is equipped pivotedly on this water-feeding opening (2a), as shown in FIG. 1.

The draining opening (2b) is formed so the seeds do not to escape therefrom by adopting any means, for example, by sticking some net material thereon.

It is needless to say that also in the case of the feeding-draining opening as is shown in FIG. 3, any means as of sticking some net material may be applied thereto in like manner.

The rotatable cultivation barrel (1) is formed in halves (1a, 1b) so as to be able to detach and attach with ease, thereby providing for the serviceableness in putting the seeds thereinto and taking out the malts therefrom.

With a view to being used in horticulture in facility agriculture, the barrel is formed with a manhole (6) for malt removal and barrel-cleaning purposes. It may be additionally provided with auxiliary rollers (10, ...) for rotating the barrel (1) and further with a sunshade (11) thereover, as occasion demands.

If circumstances require, a peep hole (7) capable of observing the growth state of malts inside of the barrel is equipped on one end face of the barrel. In the case of the barrel (1) for use in gardening as a pastime, however, it is not necessary to provide such a peep hole (7) so long as the barrel as a whole is made of transparent synthetic resinous material, whereby the growth state within the interior of the barrel can be observed without effort.

When cultivating malts (8) with the use of the cultivation barrel (1) of such construction, as is understood from FIGS. 8 (A) to (F), the seeds (4) together with water (9) are put into the barrel (1) through the water-feeding opening (2), and the seeds are left dipped in water for a required time, that is, for about a whole day and night. After the water used is drained away, the barrel is kept in such a state as illustrated in FIG. 8 (B).

At this time, since the moisture is absorbed by the seeds (4) themselves and between them, the seeds (4) stick fast to the inner wall (1c) of the barrel (1).

However, when the water contained in the seeds (4) becomes dry, then the seeds (4) break away from the inner wall (1c). Accordingly, it is necessary to supply water just before the breakaway of the seeds and immediately after that to drain it so as not to cause the water oversupply. In this way, the appropriate amount of water is always maintained both within and between the seeds (4).

It is appropiate that the quantity of water (9) to be fed in this case be held down just to the extent enough to manage to mositen anyhow the surface of the seeds or seeds.

In the course of repeating such operations as illustrated in FIGS. 8 (C), (D), (E), and (F), the germs of alfalfas, soybeans, radishes, and the like begin to grow in from three or four days to about a week.

The condition of insulation suffices for any of the barrel (1) for gardening as a pastime and the barrel (1) for the horticulture in facility agriculture, if it is selected properly taking into consideration the marketability of the grow vegetables. By way of example, alfalfas are usually insulation to become verdurons for about one and two days just before being used for food.

Description will be now directed to the cultivation appliance according to the present invention.

FIG. 4 shows an example of cultivation appliances according to the invention. The reference numeral (11) in the figure indicates a cultivation appliance in the form of a split sphere, that is, a fitted body which consists of one upper hemisphere (11a) and one lower hemisphere (11b).

The reference numeral (12) indicates a water-feeding-draining opening which is provided along the split line of the cultivation appliance. This opening is the one which is formed by cutting the respective notched holes (12a, 12b) square-shapedly on the opposite spots of the edges of both hemispheres (11a, 11b) and by fitting these two holes right in with each other.

The reference numeral (13) indicates fitting means (13a, 13b) which are to be provided in a required number on the respective hemispheres (11a, 11b) of the split sphere. These fitting means are divided between convex pieces (14) and concave grooves (15). The two engage with each other to be incorporated in one.

Both upper and lower hemispheres (11a, 11b) of the split sphere are thick only at the parts of their fitting means (13) in order to impart strength to the fitting sections (16) of the split sphere whose whole body is usually made of synthetic resinous or metallic materials.

The water-feeding-draining opening (12) is formed, in the above described example, by cutting the notched holes on the respective hemispheres (11a, 11b) of the split sphere and by fitting these holes right in with each other. But these holes may be formed in other shapes than the above, as shown in FIG. 5 (A) to (J).

Figure 5:
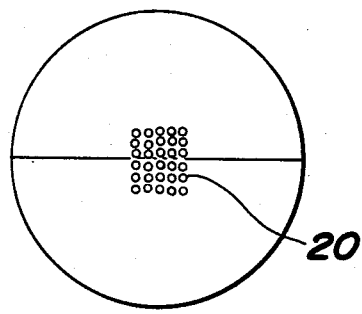
FIGS. 5 (A), (B), (C), (D), (E), (F), (G), (H), (I), and (J) show a variety of modifications of the water feeding-draining hole, respectively.
Figure 5:
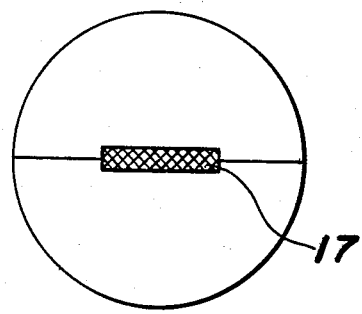
Figure 5:
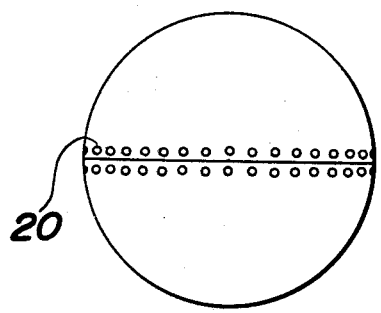
Figure 5:
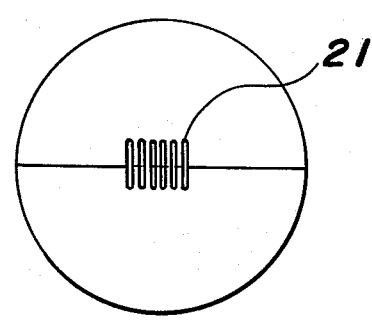
Figure 5:
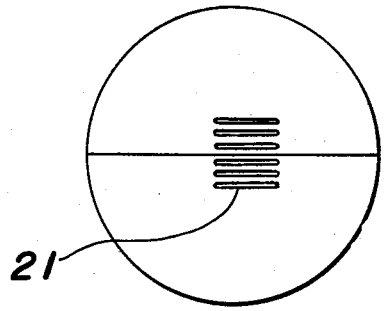
Figure 5:
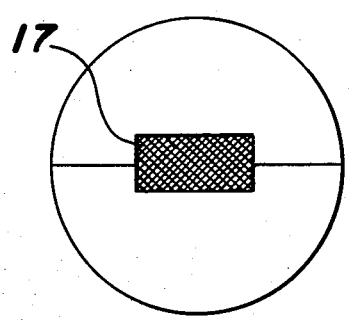
Figure 5:
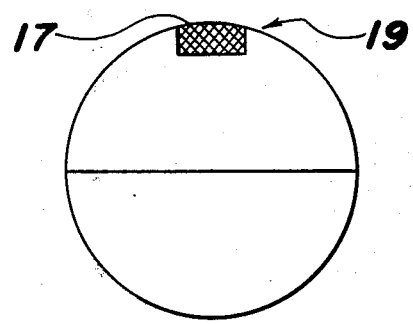
Figure 5:
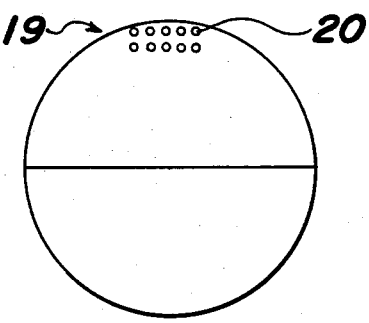
Figure 5I:
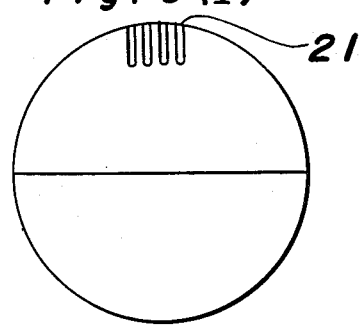
Figure 5J:
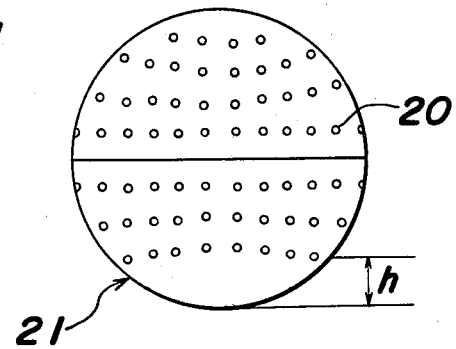

The water feeding-draining openings (12) of various types illustrated in FIGS. 5 (B), (F), and (G) are constructed by means of mesh members (17) made of metal, fibers, and synthetic resinous material, respectively. The opening in (B) is provided on the connecting region (18), and the one in (G) on the top (19) of the upper hemisphere (11a). The places whereon these openings (12) are to be provided are not always limited to the above-mentioned positions, but they are placeable on any positions of the connecting regions (18) across the split line between both hemispheres (11a, 11b).

FIGS. 5 (A), (C), (H), and (J) indicate different modified examples where a plurality of small through-holes (20) are arranged collectively or dispersedly on and around the connecting region (18) of both hemispheres (11a, 11b) or on the top part (19) thereof, otherwise on the whole surface of the split sphere (11), forming the water feeding-draining openings (12).

In this case, the diameter of such a through-hole (20) will be smaller than the diameter of the seed which is to be put into the split sphere (11). Further, in the case of dispersing the through-holes all over the surface of the split sphere (11) as in FIG. 5 (J), attention must be taken so as not to arrange them beyond a required height from the undermost part (21) of the split sphere. The reason for saying so—this is also associated with the purpose of this container or the direction for use thereof described later—is because it is necessary to hold the quantity to water of no more than the required heights from the undermost part (21) of the split sphere (11) when the seeds are put thereinto beforehand and then further they are supplied with water, in order to hold down the water to the extent to allow the seeds to be dipped in the residual water. If not so, to say more precisely, when the holes are arranged to the undermost part (21), then the water could not remain in the sphere at all.

FIGS. 5 (D), (E), and (I) illustrate other modifications wherein the water feeding-draining openings (2) are formed by making a required number of slit-shaped through-holes collectively in a similar position as in the other examples of mesh-type openings. However, the openings in these present figures are not always construed to be limited to the just described construction. As a matter of fact, one modification is feasible where a number of slit-shaped through-holes (21) will be made dispersedly over the spherical surface of the cultivation appliance.

Figure 6A:
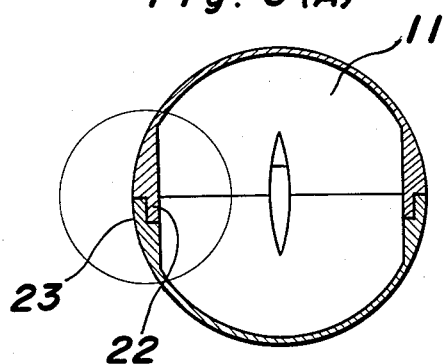
FIGS. 6 (A), (B), (C), (D), (E), (F), (G), (H), (I), and (J) show a variety of modifications of the connecting means for split spheres, respectively.
Figure 6B:
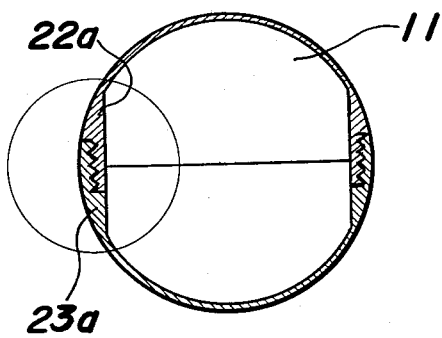
Figure 6C:
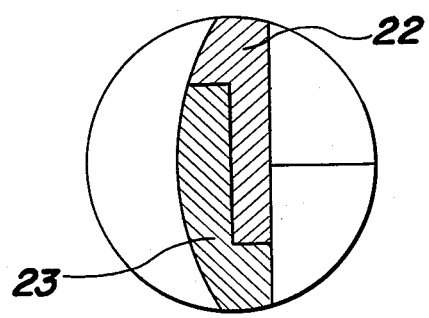
Figure 6D:
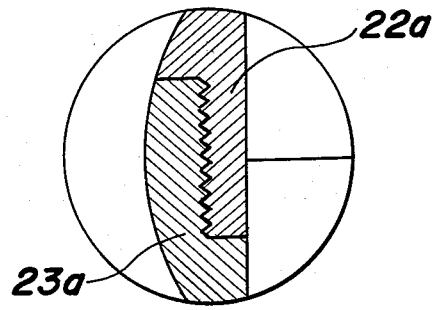
Figure 6E:
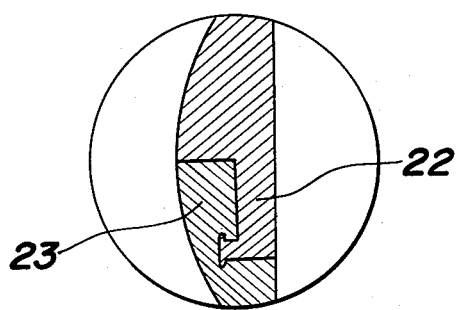
Figure 6F:
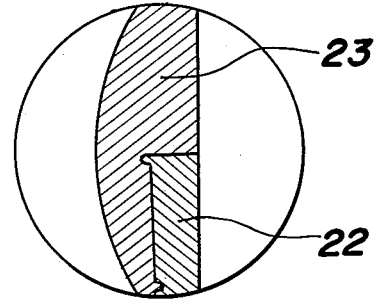
Figure 6:
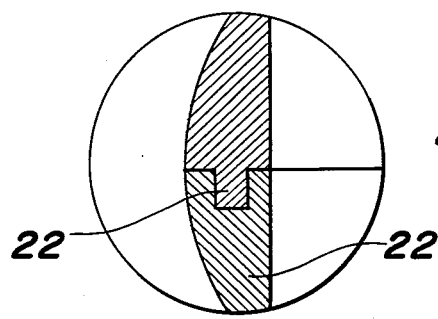
Figure 6:
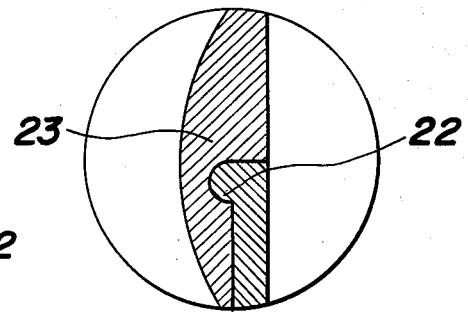
Figure 6:
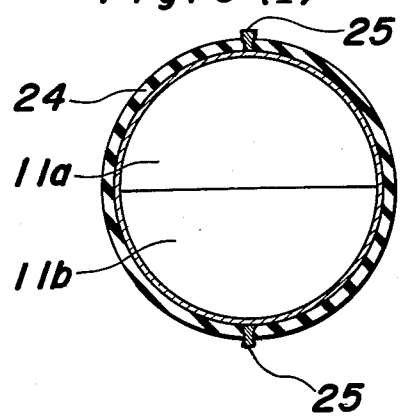
Figure 6:
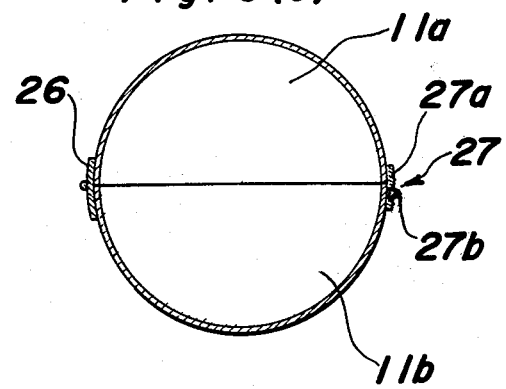

FIGS. 6 (A) to (J) indicate a variety of modifications other than those previously described of the fitting method of the hemispheres (11a, 11b), of which (A), (C), (F), (G), and (H) illustrate the examples where the fitting parts are composed of plunging pieces (22) and receiving members (23), while (B) and (D) visualize the example where the upper hemisphere (11a) and the lower hemisphere (11b) are screwed to each other by the use of the threaded parts (22a, 23a) of both plunging piece (22) and receiving member (23) to form a spherical body, that is, the split sphere (11).

In the two modifications shown in FIG. 6 (I) and (J), the upper hemisphere (11a) and the lower hemisphere (11b) are connected from outside in one body by using some kinds of engaging devices.

The modification (I) is an example where semicircular belt bodies (24), which are made of, for example, elastic synthetic resinous rubber, are made to engage with ribs (25), which are provided protuberantly or both the upper hemisphere (11a) and the lower hemisphere (11b), respectively, thereby the upper and lower hemispheres being united in one body, while on the other hand the modification (J) indicates an example where both the upper hemisphere (11a) and the lower hemisphere (11b) are made to be connected integrally by means of both a hinge (26) which is pivoted on any spot of the connected region along the split line, and an opposing clamping device (27) which consists of a concave clamping piece (27a) and a convex clamping piece (27).

Modifications of the water feeding-draining opening (12) and the fitting method, however, are not always to be construed to be limited only to the above-mentioned examples. As for the water feeding-draining opening (12), it is sufficient if it can feed water into the appliance (11) and drain it therefrom with certainty, that it would be made up of a mesh member or a plularity of holes of which an individual mesh or hole would be in diameter small enough never to allow the seeds being put in the appliance to be washed away together with the drained water outside the appliance, and that it would be provided in such a position on the appliance as not to let the water which is to remain behind within the appliance escape entirely therefrom when the water has been filled therein for that purpose.

On the other hand, the fitting system of the upper hemisphere (11a) in the lower hemisphere (11b) is not also limitted only to such kinds of examples as mentioned above. No matter what system it may be, it serves for the intended purpose if only it could unite the upper hemisphere (11a) and the lower hemisphere (11b) in a body securely and be separable.

Figure 7:
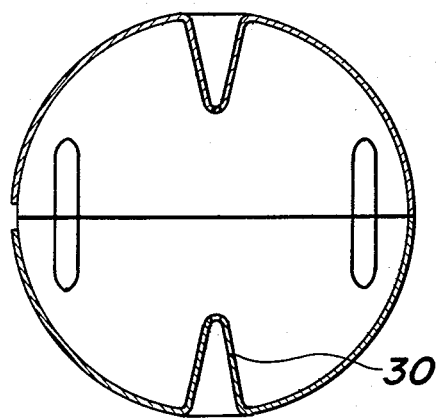
FIGS. 7 (A), (B), (C), and (D) show explanatory views of various modifications at the time of carrying out the provision of air holes on the cultivation appliances according to the present invention.
Figure 7:
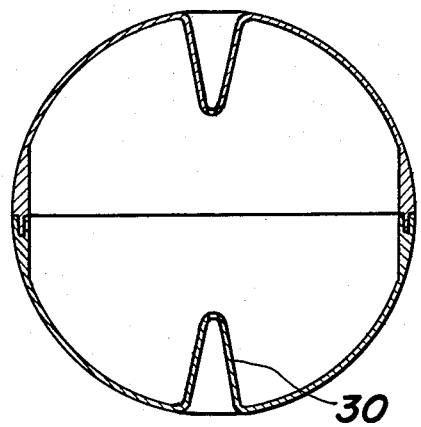
Figure 7C:
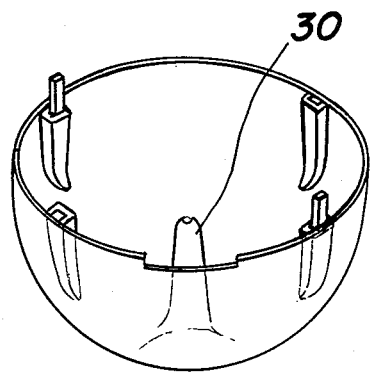
Figure 7D:
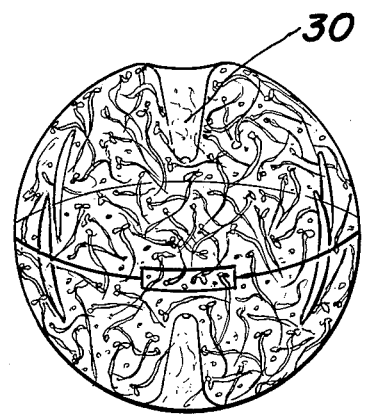
Figure 7E:
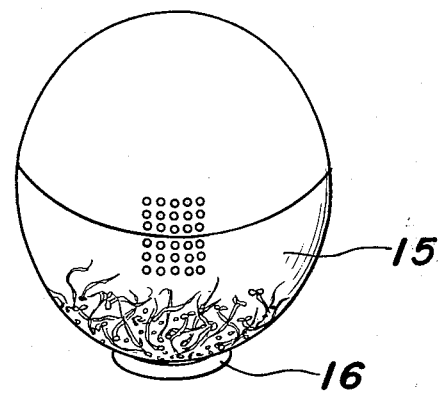
Figure 7F:

FIGS. 7 (A) to (E) are modifications of the examples where alterations are made sharply in the form of the cultivation appliance (11) according to the invention: FIGS. 7 (A) to (D) show the examples of making a change in the form by providing air holes projecting into the inside of the appliance at the middle parts of the top and bottom of the upper and lower hemispheres, respectively, while FIG. 7 (E) indicates a modification where the appliance (11) is formed into an elliptical body (15).

The reason why such modifications as mentioned above are practicable is because it suffices if the cultivation appliance (11) according to the present device could display the function able to maintain and control the water being put therein by dint of the rotatability of the appliance (11) itself. Therefore, all modifications including not only the ellipitical body (15) of FIG. 7 (E) but also the ones not shown in the drawings, if only having rotatability, will pass as the examples of the present device.

FIG. 7 (F) shows a rest ring for stabilizing the appliance to be used in FIG. 7 (E) and the others.

The use the cultivation appliance (11) constructed as mentioned above will be now described with reference to the drawings in FIG. 8.

As a start, separating the upper hemisphere (11a) from the lower hemisphere (11b), the seeds (27) and the water (28) are put into the lower hemisphere (11b) (FIG. 8 (A)).

After that, when the upper hemisphere (11a) is fitted in the lower hemisphere (11b), the appliance (11) is left as it is for about 12 hours in the summer, or for about 24 hours in the winter (FIG. 8(B)).

Later on, the meanwhile yellowed water (28) is drained through the feeding-draining opening (12) outside the appliance (11) (FIG. 8(D)).

After this drainage, the appliance is left further for twenty-four hours intact (FIG. 8(E)).

At the time of this intact, the temperature within the appliance (11) must be kept at the optimum temperature resonably selected according to the seeds therein. By way of example, it is 15°–25° C. in the case of alfalfa.

Referring to the quantity of radiation, neither exposure to direct sunlight nor the complete nonexposure as in a darkroom is desirable. It is desirable to hold down to the degree of exposure to not much more than necessary to life maintain.

After having finished the above-mentioned arrangements, the water (28) is filled again in the appliance (11) in a way as shown in FIG. 8 (C), checking to the extent enough water is present to moisten the gaps among the seeds; the water (28) left over must be drained without delay (FIG. 8 (D)).

When the above-mentioned operation is repeated in the course of the required days, for example, four or five days in the case of alfalfa, then the malts concerned grow up, as seen in FIG. 8 (F).

Still a further example of this invention will be now described in detail with reference to the accompanying drawings.

Figure 9:
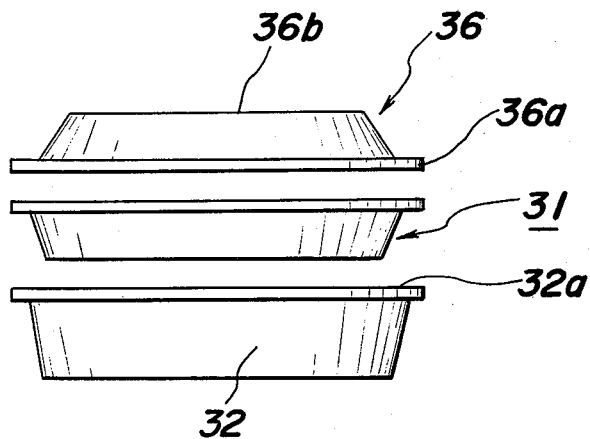
FIGS. 9 (A), (B), (C), (D), (E), (F), (G), (H), (I), and (J) are explanatory views of another-type modifications of the cultivation appliances according to the present invention, respectively.
Figure 9:
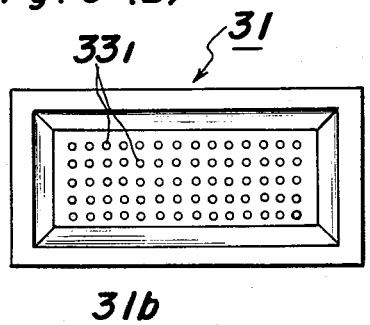
Figure 9:
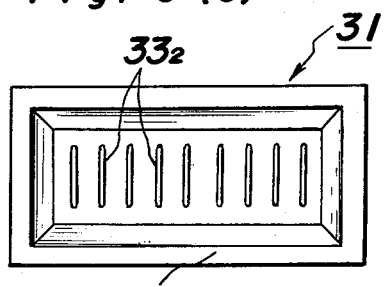
Figure 9:
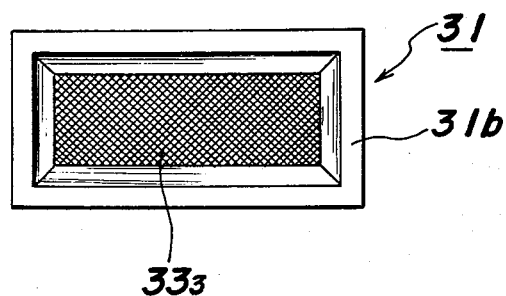
Figure 9:
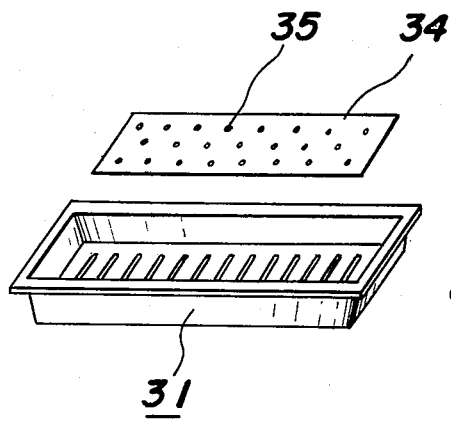
Figure 9:
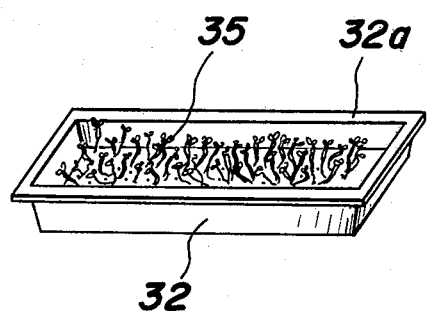
Figure 9:
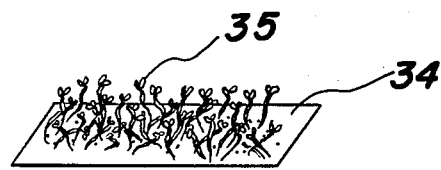
Figure 9:
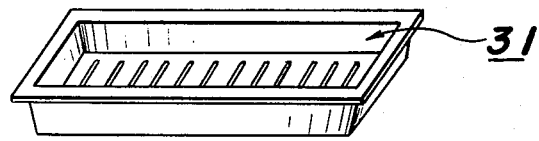
Figure 9:
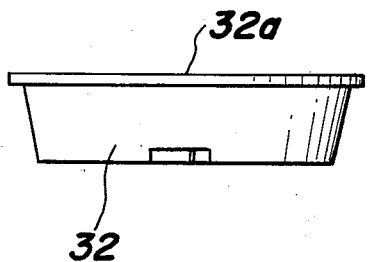
Figure 9:
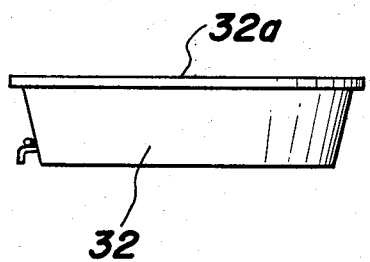

In FIG. 9 (A) to (J), the reference numeral (31) indicates a hollow rectangular draining member which narrows down taperingly toward the bottom. This draining member (31) is furnished with a flange (31a) surrounding its upper circumferential edge so as to be placeable on a receiving pan (32), and it (31) is further equipped with an excess water-draining port (33) on its bottom (31b).

The excess water-draining port (33) may be modified into various kinds of shapes, as shown illustrated in FIG. 9 (B) to (E).

FIG. 9 (A) shows a draining member (31) having the required number of small circular through-holes ($33_1$) bored in the bottom (31b), FIG. 9 (B) shows another draining member (31) having the required number of slit-shaped through-holes ($33_2$) bored in the bottom (31b), and FIG. 9 (D) shows a further draining member (31) using some mesh member ($33_3$) for the bottom (31b).

The reference numeral (34) indicate a supporting member consisting of paper, cloth, sponge, and the like, according to circumstances, whereon the seeds (35) are arranged. This supporting member (34) is placed on the bottom of the draining member (31).

After the malts have grown up, the supporting member (34) is taken out together with the malts from within the draining member (31) and is replaced by a new supporting member (34).

In this connection, beside the above mentioned types of supporting members (34), such as each having the size of, respectively, the small circular through-hole ($33_1$), the slit-shaped through-hole ($33_2$), and each mesh of the mesh member ($33_3$) smaller than the diameter of the seed (35) to be filled, it is also unrestricted to use as a substitute for any of the above-mentioned a different kind of draining member (31) where the seed (35) is fixed directly into each hole or mesh (33) and made to be germinated.

As for the receiving pan (32), it constitutes a hollow rectangular body which narrows down taperingly toward the bottom. Formed around its upper circumferential edge is a flange (32a) on which the draining member (31) is to be mounted. This receiving pan (32) stores the excess water which is discharged dropwise from the draining member (31). The height ($h_1$) of the bottom of the draining member (31) is made higher to some extent than the hight ($h_2$) of the concave part of the receiving pan (32) in order that the seeds are not dipped in the excess water.

The discharge of the excess water stored is done by removing the receiving pan (32) from the draining member (31). Perhaps, when occasions require, it may be possible to change the design of the receiving pan (32) in such a manner that the excess water stored shall be discharged by providing any kind of drain valve on the lower part of the side wall of the receiving pan (32).

The reference numeral (36) indicates a hollow rectangular lid which narrows upward taperingly. This lid (36) is formed with a flange (36a) around its lower edge. By using this flange (36a), the lid (36) is covered on the draining member (31).

The lid (36) is usually made of transparent or semitransparent material, which serves to control the quantity of light being radiated on the seeds, enables one to observe the state of growth of malts inside the appliance, and has the ability to prevent the intrusion of foreign matters such as dust, dirt, and the like. On the top surface (36b) of the lid (36), some kind of grip may be provided to make it easy to open and close the lid.

Although the draining member (31), the receiving pan (32), and the lid (36) are all shaped in the form of a rectangular body in the present example, they may of course be formed into some cylindrical shape or some triangular prism-like shape, and others according to their mounting place or to a person's preference.

In the appliance for cultivating malts of many species, the seeds are arranged on the supporting member (34) made of paper, cloth, and the like, otherwise they are fitted direct into the holes (33) on the bottom (31b) of the draining member (31).

When the seeds (35) being filled in the draining member (31) are fed suitably with water, both the seeds themselves and paper or cloth as component of the supporting member (34) absorb the necessary quantity of water, while the excess water is discharged dropwise through the excess water-discharging port (33) such as the small circular through-holes and the like into the receiving pan (32), thereby the seeds being protected from becoming rotten under the influence of the excess water.

The discharge of the excess water stored in the receiving pan (32) is done by removing the receiving pan (32) from the draining member (31), or else through the drain valve being equipped on the lower side of the receiving pan (32).

After the completion of water supply, the lid (36) is covered onto the draining member (31) to prevent the intrusion of dust, while on the other hand the control of the quantity of light is made by use of lids of materials of different transmittivity, otherwise by stacking them fittingly one over another.

What is claimed is:

1. A process for easily cultivating malts of many species using a global cultivation appliance comprising one upper hemisphere and one lower hemisphere which includes the steps of:
   (a) putting the seeds with water into the global cultivation appliance,
   (b) dipping the seeds in water in the said appliance for a required time,
   (c) draining away water from the said appliance except the water absorbed by the seeds themselves and between them,
   (d) keeping the said appliance in condition that the seeds stick to the inner wall for a required time,
   (e) supplying water just before the breakaway of the drying seeds from the curved inner wall of the said appliance,
   (f) immediately draining water from the said appliance after supplying so as to keep the appropriate amount of water maintained both within and between the seeds, and
   (g) repeating the above (e) and (f) operations to grow malts of many species.

* * * * *